(12) United States Patent
Kubota (10) Patent No.: US 8,724,024 B2
(45) Date of Patent: May 13, 2014

(54) VIDEO SIGNAL OUTPUT DEVICE AND METHOD

(75) Inventor: Akihiro Kubota, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1517 days.

(21) Appl. No.: 11/941,538

(22) Filed: Nov. 16, 2007

(65) Prior Publication Data

US 2008/0122976 A1 May 29, 2008

(30) Foreign Application Priority Data

Nov. 24, 2006 (JP) ................................. 2006-317308

(51) Int. Cl.
*H04N 5/10* (2006.01)
*H04N 5/44* (2011.01)
*H03L 7/00* (2006.01)

(52) U.S. Cl.
USPC ............ 348/530; 348/537; 348/540; 348/553

(58) Field of Classification Search
USPC ......... 348/441, 501, 512, 529–531, 537, 540, 348/547, 552
See application file for complete search history.

(56) References Cited

U.S. PATENT DOCUMENTS

| | | | |
|---|---|---|---|
| 5,280,396 A * | 1/1994 | Hamaguchi et al. | 348/525 |
| 6,175,385 B1 * | 1/2001 | Kohiyama et al. | 348/537 |
| 7,091,944 B2 * | 8/2006 | Wang | 348/419.1 |
| 2001/0043621 A1 * | 11/2001 | Anderson et al. | 370/516 |
| 2004/0141731 A1 | 7/2004 | Ishioka et al. | |
| 2005/0012738 A1 * | 1/2005 | Gong et al. | 345/212 |
| 2005/0078126 A1 * | 4/2005 | Park et al. | 348/581 |
| 2005/0237429 A1 * | 10/2005 | Grundmeyer et al. | 348/510 |
| 2007/0103805 A1 * | 5/2007 | Hayashi et al. | 360/39 |

FOREIGN PATENT DOCUMENTS

| | | |
|---|---|---|
| JP | 04-267688 | 9/1992 |
| JP | 09-252292 | 9/1997 |
| JP | 2001-125548 | 5/2001 |
| JP | 2005-286749 | 10/2005 |

OTHER PUBLICATIONS

Japanese Office Action for JP2006-317308 mailed Aug. 16, 2011 with English translation.

* cited by examiner

*Primary Examiner* — Randy Flynn
(74) *Attorney, Agent, or Firm* — Brinks Gilson & Lione (57) ABSTRACT

A video signal output device and method are capable of easily displaying moving images while synchronizing transmission-side data and reception-side data even if video data is asynchronously transferred to the reception side from the transmission side. A video signal output device for receiving video data transmitted from a transmitter in sync with a first clock through a communication unit, storing the video data in a storage unit, reading the video data from the storage unit in sync with a second clock, and displaying moving images on a display unit, includes a synchronization adjustment unit for detecting a video data correction amount in accordance with a reference video data amount in one vertical synchronous period and a video data amount of the second clock in one vertical synchronous period to adjust a predetermined horizontal scanning period in accordance with the video data correction amount. The synchronization adjustment unit may distribute the video data correction amount to a plurality of invalid horizontal scanning periods not contributing to the display of moving images and adjust the plurality of invalid horizontal scanning periods.

18 Claims, 7 Drawing Sheets

VIDEO SIGNAL OUTPUT DEVICE AND METHOD

RELATED APPLICATIONS

The present application claims priority to Japanese Patent Application Number 2006-317308, filed Nov. 24, 2006, the entirety of which is hereby incorporated by reference.

BACKGROUND OF THE INVENTION

1. Field of the Invention

The present invention relates to a video signal output device and method, and more specifically to a video signal output device and method suitable for synchronous processing of video signals with a clock different from a clock on a transmission side.

2. Description of the Related Art

To transmit moving images in real time, for example, streaming-playback-based digital communications have been performed. In such digital communications, video signals are processed as follows.

An analog video signal input to a transmitter through broadcasting or the like is converted into digital video data with an analog/digital converter and stored in a transmission-side buffer. For efficient utilization of a network bandwidth, the digital video data is further encoded and compressed The digital video data or encoded information stored in the transmission-side buffer is packetized and transmitted to a receiver via a network.

The receiver receives the packets and stores digital video data in a reception-side buffer. The digital video data in the reception-side buffer is read at a predetermined timing in accordance with a clock and converted into analog video data with a digital/analog converter and then output and displayed as a moving image. If the digital video data is encoded and compressed, decoding processing is carried out to expand the video data to generate digital video data.

An IEEE1394-based high-speed serial bus has been employed as an interface suitable for such real-time transfer.

If data is transferred with an asynchronous transfer bus such as the IEEE1394-based bus, it is necessary to execute synchronous processing on data received by the receiver in accordance with an amount of data output from the transmitter.

In the case where the clocks differ between the transmission side and the reception side, if a clock rate on the transmission side is higher than that on the reception side, there is a possibility of the reception-side buffer overflowing. If the overflow occurs, video data is partially destructed on the reception side, resulting in a problem of unsmooth moving images.

In contrast, if a clock rate on the transmission side is lower than that on the reception side, there is a possibility of underflow occurring in the reception-side buffer. If the underflow occurs, video data cannot be displayed on the reception side, resulting in a problem of discontinuous moving images.

As a technique that overcomes these problems, Japanese Unexamined Patent Application Publication No. Hei 9-252292 discloses a method of monitoring data buffer occupancy on the reception side to control an oscillation frequency of a system clock on the transmission side to approximately synchronize the system clock on the transmission side and a system clock on the reception side. Further, Japanese Unexamined Patent Application Publication No. 2005-286749 discloses a method of monitoring an amount of received data stored in a reception-side buffer, and optionally adjusts a clock accuracy on the reception side if the stored data amount deviates from a reference data amount to thereby match a processing rate on the transmission side with that on the reception side.

As described above, as a countermeasure against the overflow or underflow of the reception-side buffer that receives video data, a buffer data amount is monitored to control an oscillation frequency of a clock on the reception side.

However, it is necessary to continuously monitor the buffer data amount to check an amount of data stored in the buffer in order to control a clock oscillation frequency, with the result that a device configuration is complicated. In general, a PLL (phase locked loop) is used to control an oscillation frequency. However, its configuration is complicated and costly.

Incidentally, the methods disclosed in Japanese Unexamined Patent Application Publication Nos. Hei 9-252292 and 2005-286749 do not employ a PLL. However, it is necessary to continuously monitor a buffer data amount to control a clock oscillation frequency, which puts a heavy burden on a CPU.

SUMMARY OF THE INVENTION

The present invention has been accomplished in view of the above problems involved in the related art, and it is accordingly an object of the present invention to provide a video signal output device and method capable of easily displaying moving images while synchronizing transmission-side data and reception-side data even if video data is asynchronously transferred to the reception side from the transmission side.

To attain the above object, according to a first aspect of the present invention, a video signal output device for receiving video data transmitted from a transmitter in sync with a first clock through a communication unit, storing the video data in a storage unit, reading the video data from the storage unit in sync with a second clock, and displaying moving images on a display unit, includes: a synchronization adjustment unit for detecting a video data correction amount in accordance with a reference video data amount in one vertical synchronous period and a video data amount of the second clock in one vertical synchronous period to adjust a predetermined horizontal scanning period in accordance with the video data correction amount.

In the video signal output device according to the aspect of this present invention, if the video data correction amount is 2 bits or more and a predetermined value or less, the synchronization adjustment unit may distribute the video data correction amount to a plurality of invalid horizontal synchronous periods not contributing to the display of moving images, to delete or add video data and adjust the plurality of invalid horizontal synchronous periods. If the video data correction amount is larger than a predetermined value, the synchronization adjustment unit may distribute the video data correction amount to a plurality of invalid horizontal synchronous periods not contributing to the display of moving images and to a plurality of valid horizontal synchronous periods contributing to the display of moving images, to delete or add video data and adjust the plurality of invalid horizontal synchronous periods and the plurality of valid horizontal synchronous periods.

According to one embodiment of the video signal output device of the present invention, a video data correction amount is detected in accordance with a reference video data amount in one vertical synchronous period and a video data amount of a clock of the video signal output device in one vertical synchronous period to increase/reduce data bit amounts of a plurality of horizontal scanning lines by a data bit amount corresponding to the video data correction amount. The horizontal scanning lines including invalid data not contributing to the display of moving images are subjected to adjustment of the data bit amount. Hence, even if a clock rate differs between a transmission side and a reception side, it is possible to avoid a situation that the reception side cannot process received video data, and to prevent unsmooth or discontinuous moving images, for example.

Further, in order to solve the problems involved in the related art, according to another aspect of the present invention, a video signal output device for receiving video data transmitted from a transmitter in sync with a first clock through a communication unit, storing the video data in a storage unit, reading the video data from the storage unit in sync with a second clock, and displaying moving images on a display unit, includes: a synchronization adjustment unit for detecting a video data correction amount in accordance with a reference video data amount in one horizontal synchronous period and a video data amount of the second clock in one horizontal synchronous period, to adjust a predetermined horizontal scanning period in accordance with the video data correction amount.

In the video signal output device according to this aspect of the present invention, the synchronization adjustment unit may convert the video data correction amount in one horizontal synchronous period into a video data correction amount in one vertical synchronous period, and if the video data correction amount is 2 bits or more and a predetermined value or less, the synchronization adjustment unit distributes the video data correction amount to a plurality of invalid horizontal synchronous periods not contributing to the display of moving images, to delete or add video data and adjust the plurality of invalid horizontal synchronous periods. Further, if the video data correction amount is larger than a predetermined value, the synchronization adjustment unit may distribute the video data correction amount to a plurality of invalid horizontal synchronous periods not contributing to the display of moving images and a plurality of valid horizontal synchronous periods contributing to the display of moving images, to delete or add video data and adjust the plurality of invalid horizontal synchronous periods and the plurality of valid horizontal synchronous periods.

According to the video signal output device of this embodiment, a video data correction amount is detected in accordance with a reference video data amount in one horizontal synchronous period and a video data amount of a clock of the video signal output device in one horizontal synchronous period, and a data bit amount corresponding to the video data correction amount is converted to a video data correction amount in one vertical synchronous period to increase/reduce data bit amounts of a plurality of horizontal scanning lines by a data bit amount corresponding to the video data correction amount. The horizontal scanning lines including invalid data not contributing to the display of moving images are subjected to adjustment of the data bit amount. Hence, even if a clock rate differs between a transmission side and a reception side, it is possible to avoid a situation that the reception side cannot process received video data, and to prevent unsmooth or discontinuous moving images, for example.

According to still another embodiment of the present invention, a video signal output method for receiving video data transmitted from a transmitter in sync with a first clock through a communication unit, storing the video data in a storage unit, reading the video data from the storage unit in sync with a second clock, and displaying moving images on a display unit, includes: detecting a video data correction amount in accordance with a reference video data amount in one vertical synchronous period and a video data amount of the second clock in one vertical synchronous period; and distributing the video data correction amount to at least one of a plurality of invalid horizontal synchronous periods not contributing to the display of moving images and a plurality of valid horizontal synchronous periods contributing to the display of moving images in accordance with the video data correction amount, to delete or add video data bits and adjust the horizontal scanning period.

DESCRIPTION OF THE PREFERRED EMBODIMENTS

Hereinafter, embodiments of the present invention will be described with reference to the accompanying drawings.
(Video Signal Transmitting/Receiving System Configuration and Operation)

Figure 1:
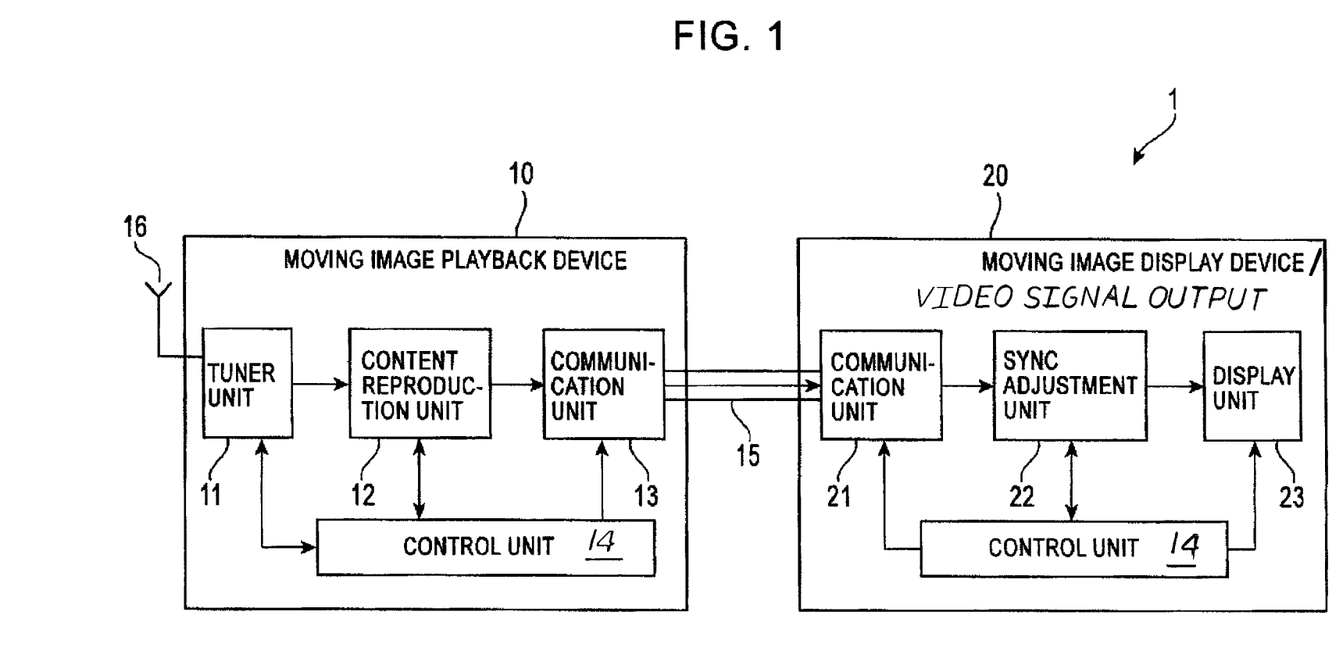
FIG. 1 is a block diagram showing the schematic configuration of a video signal transmitting/receiving system according to an embodiment of the present invention.

FIG. 1 is a block diagram showing the schematic configuration of a video signal transmitting/receiving system 1 according to an embodiment of the present invention. The video signal transmitting/receiving system 1 is configured such that a moving image playback device 10 on the video signal transmission side is communicably connected with a moving image display device (video signal output device) 20 on the video signal reception side.

The moving image playback device 10 includes an antenna 16, a tuner unit 11, a content reproduction unit 12, a communication unit 13, and a control unit 14. The moving image playback device 10 functions to receive data of satellite digital broadcasting such as BS digital broadcasting through the antenna 16, for example, and reproduce the data of video signals and transmit the data to the video signal output device 20.

The video signal output device 20 receives the data of video signals and executes predetermined data processing and then transmits the data to a display unit 23. The display unit 23 displays moving images.

The moving image playback device 10 and the video signal output device 20 are connected together via an IEEE1394-based bus 15, for example, and transmit/receive video data or other such information in an asynchronous fashion.

Figure 2:
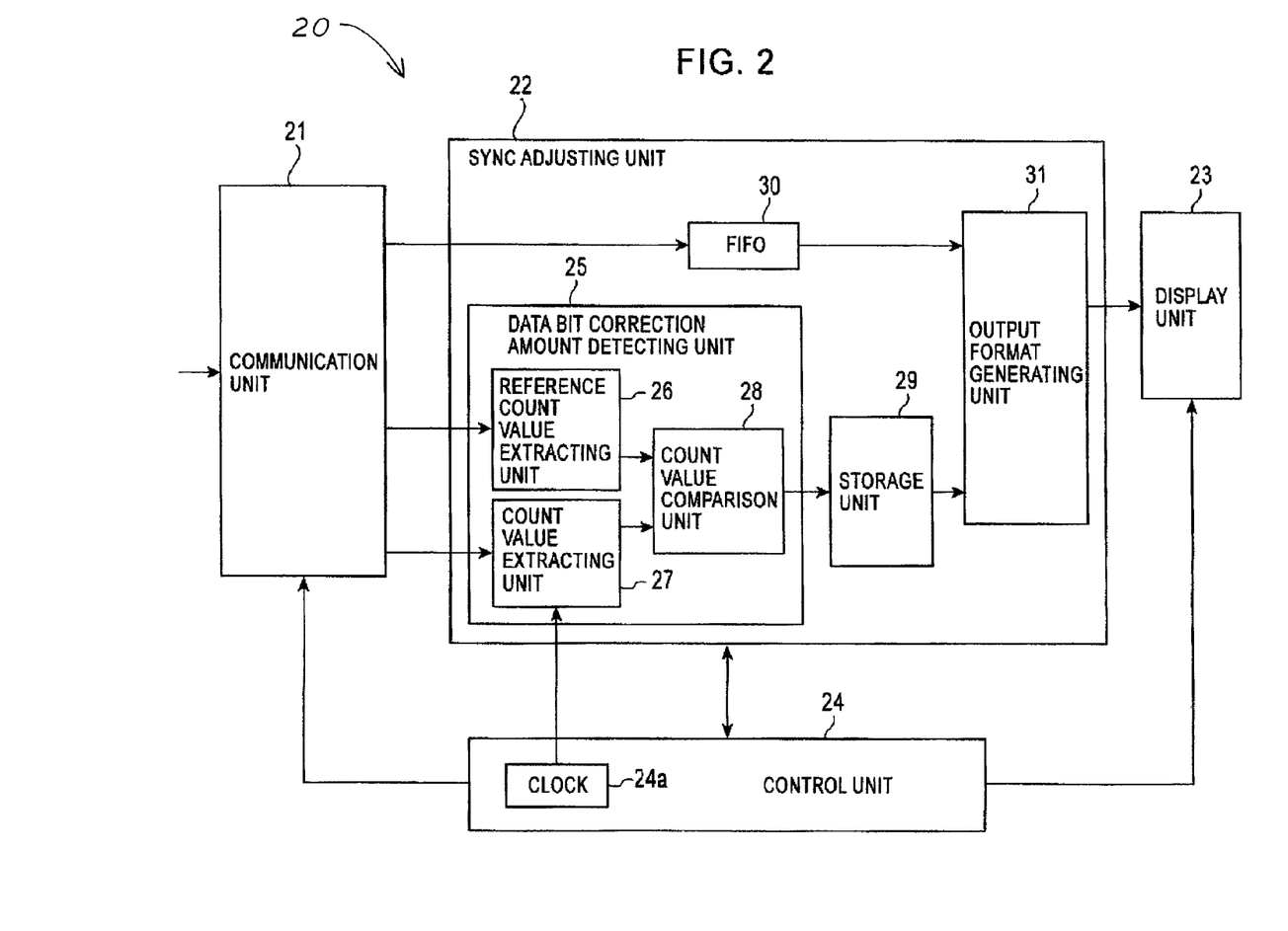
FIG. 2 is a block diagram showing the configuration of a video signal output device according to an embodiment of the present invention.

FIG. 2 is a block diagram showing the video signal output device 20. The video signal output device 20 is composed of a communication unit 21, a synchronization adjustment unit 22, a moving image display unit 23, and a control unit 24. Further, the synchronization adjustment unit 22 is composed of a data bit correction amount detecting unit 25, a FIFO 30, a storage unit 29, and an output format generating unit 31.

The communication unit 21 of the video signal output device 20 receives video signals transmitted from the moving image playback device 10 and executes processing such as extraction of content data. The video signals received by the communication unit 21 are supplied to the synchronization adjustment unit 22 and subjected to predetermined signal processing for displaying moving images, and then sent to the moving image display unit 23. The moving image display unit 23 displays moving images.

The FIFO 30 is a storage unit for video data or the like, that is, a first-in first-out type buffer. The FIFO 30 stores video data and data of vertical synchronous signals and horizontal synchronous signals in predetermined units, for example, on the basis of a horizontal scanning period.

The operation of the video signal transmitting/receiving system 1 is described below.

Digital broadcasting signals received by the antenna 16 of the moving image playback device 10 are supplied to the tuner unit 11. The tuner unit 11 extracts broadcasting signals of a program on a predetermined channel from the received digital broadcasting signals. The broadcasting signals extracted with the tuner unit 11 are supplied to the content reproduction unit 12 and decoded to video signals. The decoded video signals are supplied to the communication unit 13 in sync with a clock on the moving image playback device 10 side and then packetized.

The packets are transmitted to the communication unit 21 of the video signal output device 20 through the IEEE1394-based bus 15. The communication unit 21 extracts content data from the received packets of video signals and reconstructs the data. The reconstructed video signal data is stored in the FIFO 30. The video data stored in the FIFO 30 are extracted in sync with a clock 24a on the video signal output device 20 side and supplied to the output format generating unit 31.

On the other hand, the video data, the vertical synchronous signals, and the horizontal synchronous signals received by the communication unit 21 are supplied to the data bit correction amount detecting unit 25 The data bit correction amount detecting unit 25 counts the number of clock signals from the clock 24a used in the video signal output device during one vertical synchronous period. Then, a correction amount of video data is detected in accordance with a difference between the count value and a theoretical count value of clock signals of a reference clock. The detected data bit correction amount is stored in the storage unit 29.

The output format generating unit 31 references information about the data bit correction amount stored in the storage unit 29 and corrects video data read from the FIFO 30 to create an output format. The moving image information is supplied to the display unit 23 in accordance with the adjusted output format. The display unit 23 displays moving images synchronously with data on the transmission side.

Next, the operation of the synchronization adjustment unit 22 to correct video data bits is described in detail. Description is first made of a video data format and then of how to detect a correction amount of video data bits and how to create an output format of moving images in accordance with the data bit correction amount.

(Data Format)

A data format of video data typified by ITU-R656 is described here. The ITU-R656 is an extension of ITU-R601, standard specifications of a digital component signal used in TV broadcasting or the like. This is extended for 10-bit or 8-bit parallel transfer.

Figure 3A:
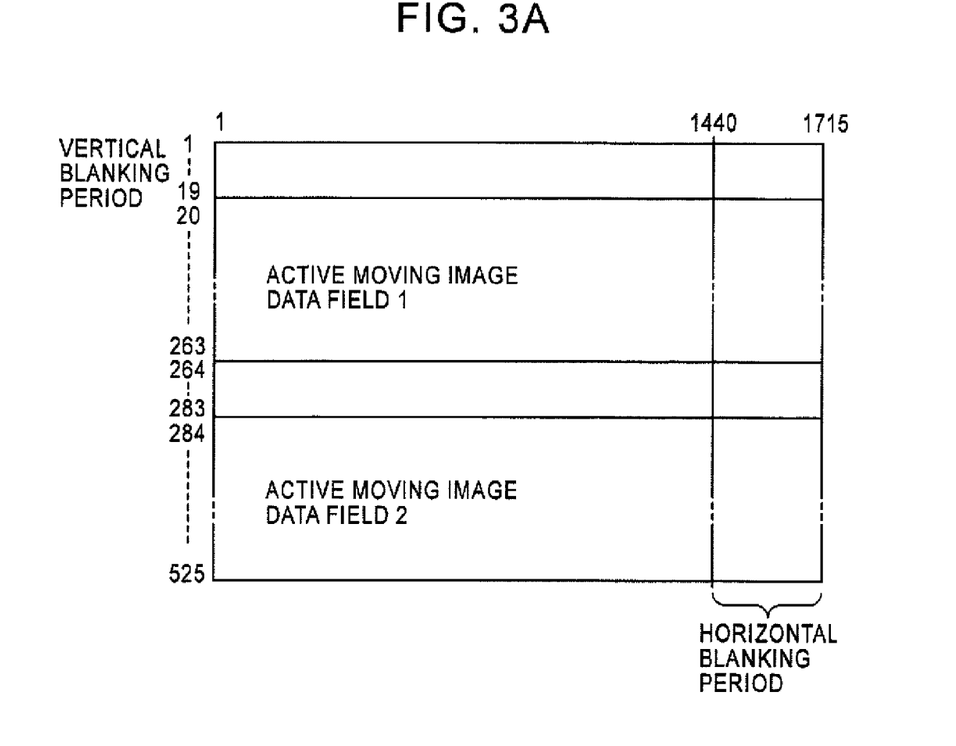
FIGS. 3A and 3B illustrate the configuration of one frame of video data.
Figure 3B:
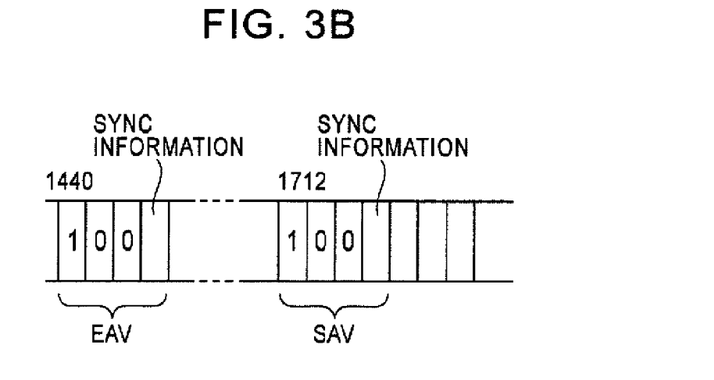

FIGS. 3A and 3B are schematic diagrams of a format of one frame of video data on the basis of ITU-R656. As shown in FIGS. 3A and 3B, each horizontal scanning line in one horizontal scanning period is composed of 1715 words. One frame includes 525 lines. In each horizontal scanning line, the 1st to 1438th words correspond to video. Data in this range is hereinafter referred to as "active video data". Further, 1440th to 1715th words correspond to a horizontal blanking period. As shown in FIG. 3B, 4 words from the 1440th word represent the end of active video data (EAV), and 4 words from the 1712nd word represent the start of active video data (SAV). Further, 3 words from the 1440th word correspond to fixed data (1, 0, 0) for identification, and the 4th word includes synchronous information including the EAV signal. The same applies to the 4 words from the 1712nd word.

On the other hand, the 1st to 19th lines and 264th to 283rd lines out of 525 lines correspond to a vertical blanking period, and 20th to 263rd lines and 284th to 525th lines correspond to an active video data period.

In such a video data format, data in the active video data range and the other data are defined as valid data and invalid data, respectively. Incidentally, in the following description about data bit correction, the horizontal blanking period does not include SAV and EAV.

(Detection of Data Bit Correction Amount)

Next, a description is given of how to detect a data bit correction amount. The detection of a data bit correction amount is targeted at video data in the first frame out of video data transmitted from the moving image playback device 10.

The synchronization adjustment unit 22 of FIG. 2 performs synchronous processing on received video data. The data bit correction amount detecting unit 25 detects a data bit correction amount of video data corresponding to a difference between the bit count of video data in one vertical synchronous period of moving images displayed on the display unit 23 and the bit count of video data in one vertical synchronous period of a reference video data format. To be specific, a data bit correction amount is detected as follows.

A video data format used for displaying video data (reference video data format) is acquired through the communication unit 21. Information about the reference video data format is transmitted together with information about video data. After acquiring the information about the reference video data format, the data bit correction amount detecting unit 25 extracts a reference count value in the reference video data format with a reference count value extracting unit 26. The reference count value is an output count value of clock signals of a reference clock in one period of vertical synchronous signals.

The count value extracting unit 27 counts the number of clock signals supplied from the clock 24a used in the video signal output device 20. The output count value in one period of vertical synchronous signals is thus detected.

For example, provided that X represents a reference count value and Y represents a count value of signals of the clock 24a of the video signal output device 20, there is a difference |X−Y| in count value. That is, there is a frequency difference |X−Y|[Hz] between the clock used in the video signal output device 20 and a reference clock.

In the case of extracting video data from the FIFO 30 at a predetermined timing and displaying moving images by use of the clocks having a frequency difference, if a clock rate of the video signal output device 20 is lower than that of the reference clock, the FIFO 30 overflows and video data needs to be partially destructed.

This embodiment focuses on video data not contributing to the display of moving images (referred to as invalid data) in the video data format, and the number of invalid data is adjusted to prevent overflow or underflow without changing a frequency of the clock 24a of the video signal output device 20.

The number of bits of video data per count is calculated on the basis of a reference clock frequency and the number of bits of video data in one vertical synchronous period of the reference format. The number of bits corresponding to a count value difference is calculated on the basis of the calculated value, and a bit rate is adjusted (increased/decreased) by the calculated number of bits to thereby create an output video data format.

(Creation of Output Format)

Next, how to create a video data output format is described. An amount of invalid data in a predetermined horizontal synchronous period is adjusted with reference to the data bit correction amount stored in the storage unit 29.

Figure 4:
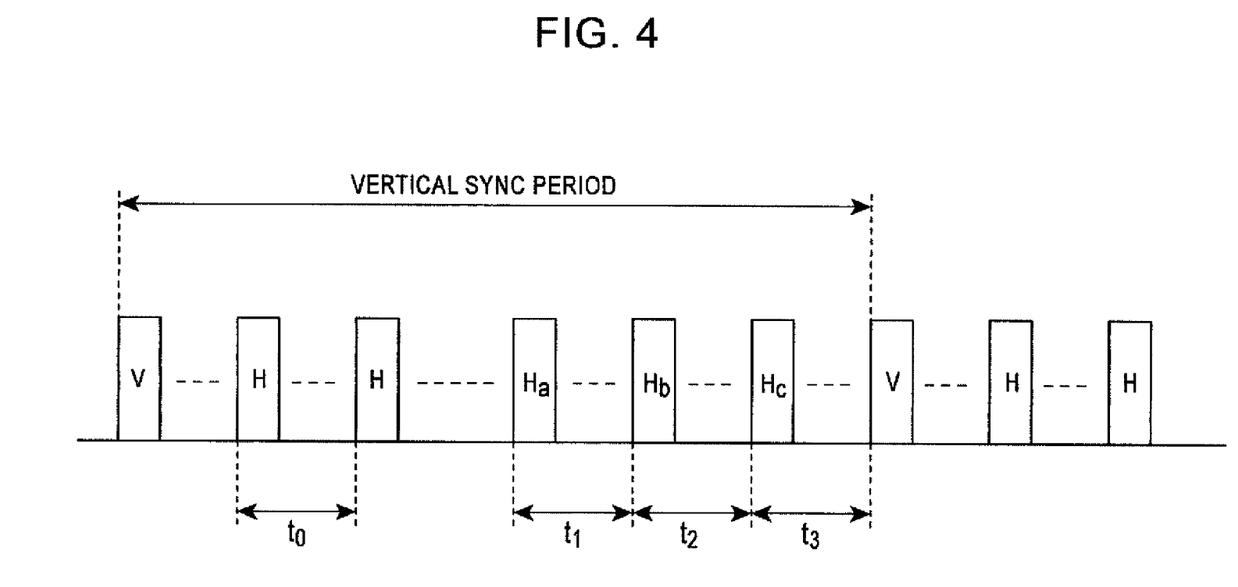
FIG. 4 shows a relationship between a vertical synchronous signal and a horizontal synchronous signal.

FIG. 4 shows a relationship between a vertical synchronous signal and a horizontal synchronous signal. In FIG. 4, a pulse V represents a vertical synchronous signal, and pulses H, Ha, Ab, and Hc represent horizontal synchronous signals. Video data bits that represent moving image information are arranged between the vertical synchronous signal and the horizontal synchronous signal.

A period from one vertical synchronous signal to the next vertical synchronous signal (vertical synchronous period) is defined as one frame of video signals. A horizontal synchronous period defined by horizontal synchronous signals is divided into an invalid horizontal synchronous period including only invalid data not contributing to the display of moving images and a valid horizontal synchronous period including data bits (referred to as valid data) contributing to the display of moving images.

In FIG. 4, time t0 between the horizontal synchronous signals H is a valid horizontal synchronous period, and time t1, time t2, and time t3 correspond to an invalid horizontal synchronous period.

The above data bit correction amount, that is, bits to be processed out of the video data bits are at least one of invalid data in the invalid horizontal synchronous period and invalid data in the valid horizontal synchronous period. The data bit correction is basically performed such that bits are processed in plural horizontal synchronous periods, and invalid data is deleted or added. In this way, the horizontal scanning period is adjusted.

The number of bits is adjusted to suppress a change in the number of bits between adjacent horizontal synchronous periods. If the number of bits is adjusted between the adjacent horizontal synchronous periods in this way, even when noise is generated along with a change in clock cycle between the horizontal synchronous periods, the noise is not visually recognized, and satisfactory moving images can be displayed.

Figure 5:
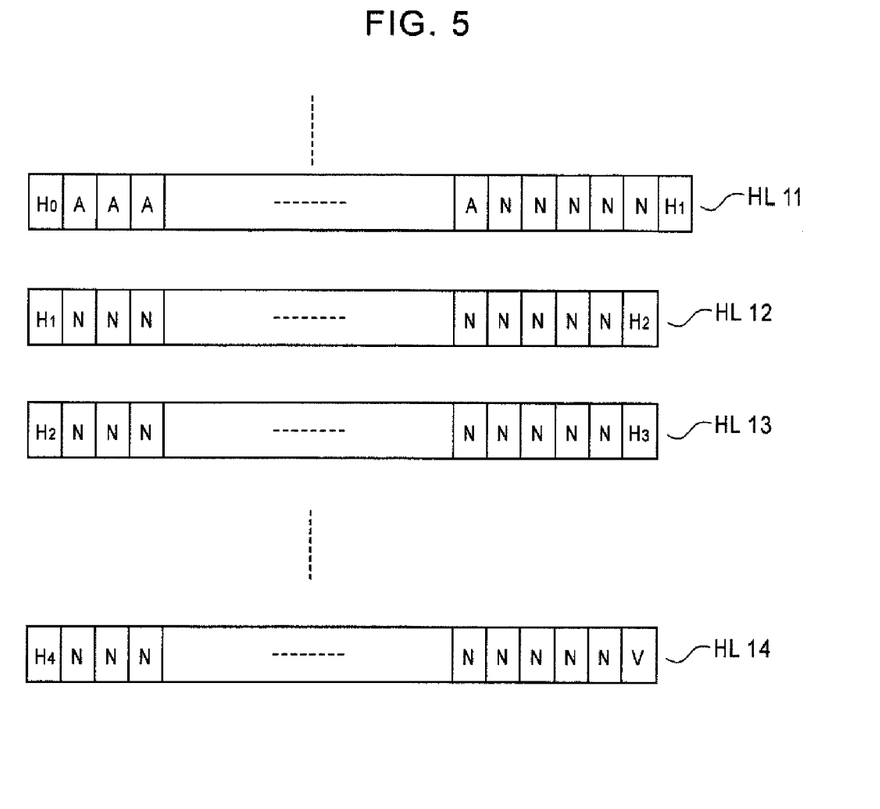
FIG. 5 illustrates how to adjust data bits in a synchronization adjustment unit (part 1)
Figure 6:
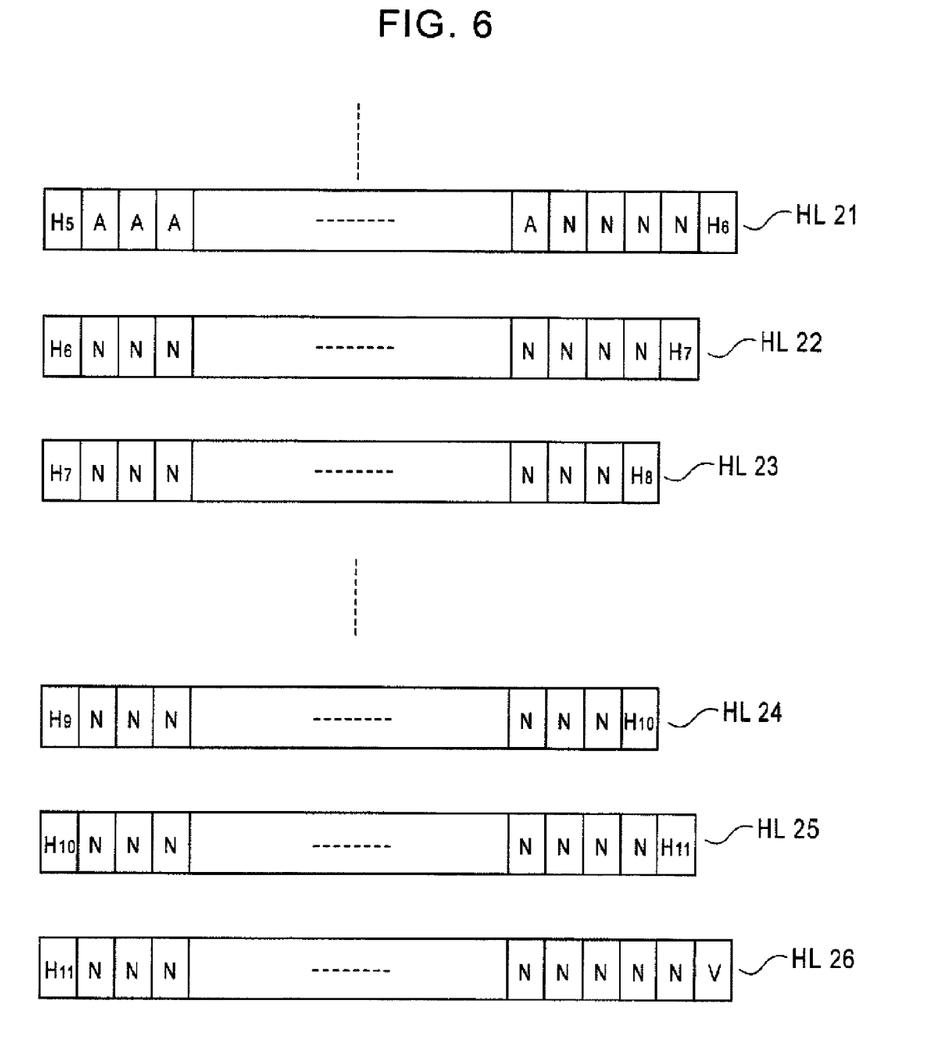
FIG. 6 illustrates how to adjust data bits in a synchronization adjustment unit (part 2)
Figure 7:
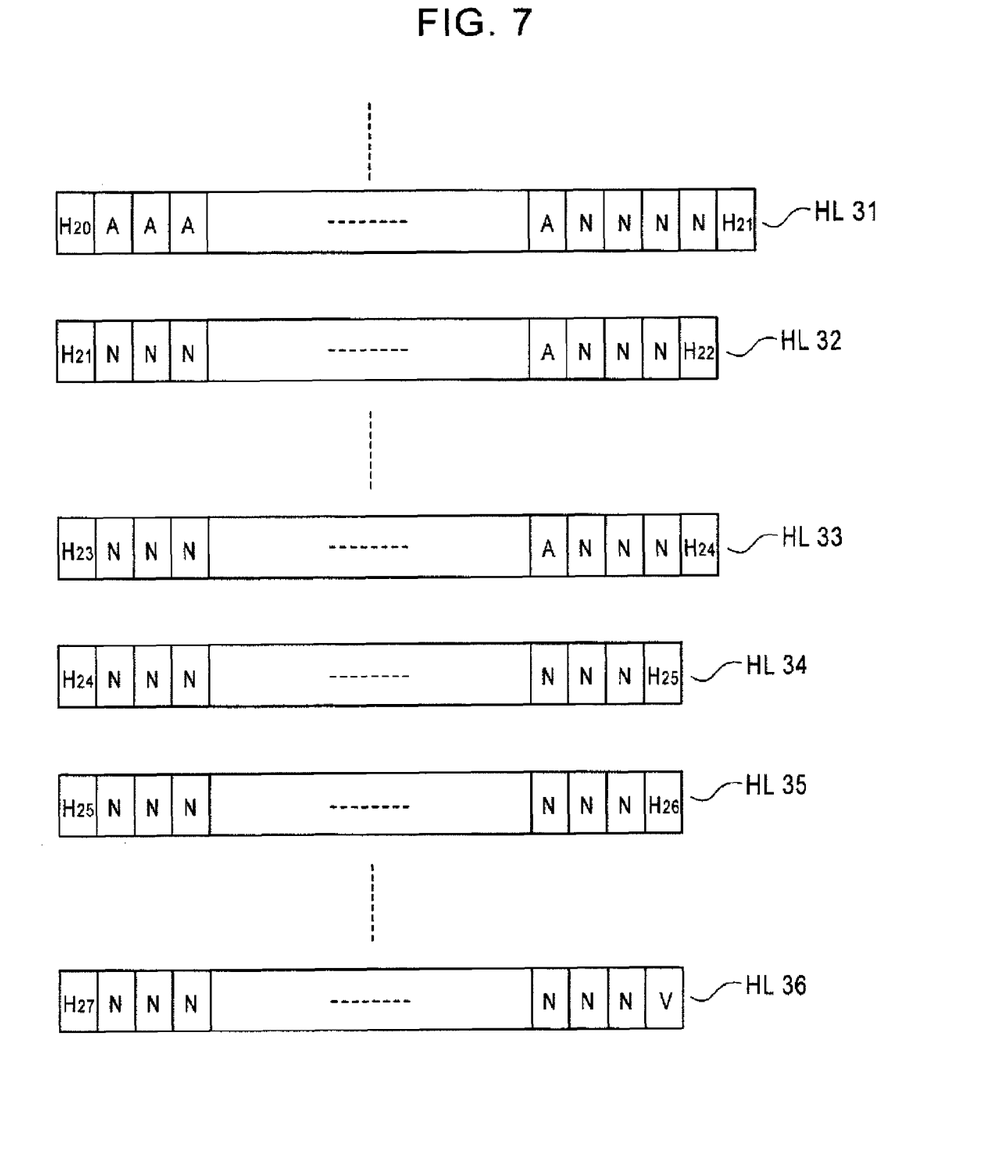
FIG. 7 illustrates how to adjust data bits in a synchronization adjustment unit (part 3).

Referring to FIGS. 5 to 7, a method of creating the video data output format is described hereinbelow.

The video data bit correction upon creation of the video data output format is performed in different ways in accordance with whether or not the detected bit correction amount is larger than a predetermined value.

In this embodiment, a correction amount is defined as follows. However, this definition is used for illustrative purposes, and a correction amount may be determined as appropriate in accordance with a display device used or a reference video data format.

A correction amount is assumed small if the change in data amount with respect to a horizontal synchronous period defined by the reference format is 100 ppm or less; the correction amount is assumed large if the change is more than 100 ppm. Provided that xd represents an amount of data in one horizontal synchronous period under normal conditions and xc represents an amount of data in one horizontal synchronous period after data correction, a data correction amount that satisfies "1−(xc/xd)≤100 ppm" is assumed small.

Here, the data bit correction is considered in two cases: a small correction amount and a large correction amount.

(1) Small Correction Amount

If a correction amount is small, invalid data in a horizontal scanning period only including invalid data (invalid horizontal scanning period) of the horizontal scanning periods is erased by a correction amount. If the data bit correction amount is 2 bits or more, the correction amount is shared among plural invalid horizontal scanning periods in one frame, and the invalid data is deleted. For example, if the data bit correction amount is 10 bits, 1 bit each is deleted from 10 invalid horizontal scanning periods.

FIG. 5 shows a part of the horizontal scanning period in one frame and illustrates how to adjust invalid data of the horizontal scanning period. In FIG. 5, HL11 denotes a valid horizontal scanning line of the valid horizontal scanning period, and HL12 to HL14 denote invalid horizontal scanning lines of an invalid horizontal scanning period.

The valid horizontal scanning line HL11 is a period from the horizontal synchronous signals H0 to H1, and this period includes valid data A and invalid data N. Further, the valid horizontal scanning line HL11 includes a predetermined number of data bits as a reference in one horizontal scanning period.

The invalid horizontal scanning line HL12 is a period from the horizontal synchronous signals H1 to H2, and this period is composed of invalid data N alone. The same holds true of invalid horizontal scanning lines HL13 and HL14.

FIG. 5 shows an example where bits are deleted from plural invalid horizontal scanning lines (HL12, HL13, and HL14) by the same amount. In the example of FIG. 5, 1 bit each is deleted from plural invalid horizontal scanning lines, but the number of invalid horizontal scanning lines from which bits are deleted may be reduced. For example, if the data bit correction amount is 10 bits, 2 bits each may be deleted from 5 invalid horizontal scanning lines.

Incidentally, a difference in the number of data bits between the invalid horizontal scanning line from which invalid data is deleted and an adjacent valid horizontal scanning line or invalid horizontal scanning line, from which invalid data is not deleted, is minimized. This is to prevent noise streaks that might periodically occur if there is a large difference in clock cycle between horizontal synchronous periods FIG. 6 shows another example of how to adjust data bits. In FIG. 6, a horizontal scanning line HL21 is a valid horizontal scanning line, and lines HL22 to HL26 are invalid horizontal scanning lines.

In the example of FIG. 6 as well, invalid data of plural invalid horizontal scanning lines are deleted to adjust a horizontal scanning period. However, a correction amount of invalid data is not uniform among the invalid horizontal scanning lines (unlike the correction of FIG. 5), but rather is determined such that an amount of change in the number of bits is uniform between adjacent invalid horizontal scanning lines. Thus, an amount of change in the number of bits between the lines HL21 and HL22 is 1 bit. That is, 1 bit is deleted from the line HL22. 2 bits are deleted from the line HL23; an amount of change in the number of bits from the line HL22 to the line HL23 is −1. Further, 2 bits are deleted from the line HL24, and 1 bit is deleted from the line HL25; an amount of change in the number of bits from the lines HL24 to HL25 is +1.

In this way, the correction amount is determined such that the number of bits is gradually changed between adjacent horizontal scanning lines. As a result, disturbance of moving images can be prevented.

Incidentally, in the example of FIG. 6, although an amount of change in the number of bits between adjacent lines is 1, it may be set to 2 as long as the moving images involve no disturbance. Further, the correction amount may be determined such that the number of bits may be changed between adjacent horizontal scanning lines alternately between a positive value and a negative value.

(2) Large Correction Amount

If a correction amount is large, in addition to adjustment of data bits of invalid horizontal scanning lines, invalid data of valid horizontal scanning lines are corrected. As described above, in the case of deleting data bits from the invalid horizontal scanning lines, if a correction amount is large, an amount of change in frequency is increased in accordance with movement from the valid horizontal scanning line to the invalid horizontal scanning line. As a result, moving images are blurred. To overcome this problem, invalid data of the valid horizontal scanning lines are also deleted to minimize frequency change between the valid horizontal scanning line and the invalid horizontal scanning line.

FIG. 7 shows an example of how to adjust invalid data in valid horizontal scanning lines.

In FIG. 7, HL31 to HL33 denote valid horizontal scanning lines, and HL34 to HL36 denote invalid horizontal scanning lines. The valid horizontal scanning line HL31 includes a predetermined number of data bits as a reference in one horizontal scanning period.

For the invalid horizontal scanning lines HL34 to HL36, 2 bits each are deleted from the number of data bits as a reference in one horizontal scanning period. For example, if the result of deleting 2 bits each from all invalid horizontal scanning lines does not reach a data bit correction amount, as indicated by HL32 and HL33 of FIG. 7, invalid data of the valid horizontal scanning period is additionally deleted to adjust a horizontal scanning period.

If a correction amount is large, the number of invalid data bits in valid horizontal scanning periods is adjusted. As in the case where the correction amount is small, a correction amount may be changed from one scanning line to another instead of using the same correction amount. In this case, the correction amount is adjusted to minimize change in the number of video data bits between adjacent horizontal scanning periods.

Through the above data bit correction, even if the moving image playback device and the video signal output device have different clocks, overflow, underflow, or other such phenomena are not caused by the clock difference, making it possible to prevent disturbance of moving images. In addition, it is unnecessary to configure a complicated circuit such as a PLL circuit and adjust a clock, and simple and highly reliable synchronous processing can be performed.

Incidentally, the first two frames of video data received with the video signal output device 20 are used for calculating a correction amount of data bits. Since the data bit amount is not corrected, the frames are not used for displaying moving images. It is confirmed that, even if the images corresponding to the two frames are not displayed, normal moving images can be displayed.

Further, the above embodiment describes the case of deleting data bits to adjust a horizontal scanning period. However, if a clock rate of the clock 24a of the video signal output device 20 is higher than that of a reference clock, data bits are added to adjust the horizontal scanning period.

Modified Example 1

In the data bit correction of the above embodiment, a correction amount of data bits is calculated on the basis of a difference between a data bit amount of one frame of the clock 24a of the video signal output device 20 and a data bit amount of a reference format. In Modified Example 1, a correction amount of data bits is calculated on the basis of a data bit amount in one horizontal synchronous period.

The configuration of the synchronization adjustment unit is the same as in the above embodiment.

For example, the communication unit 13 of the moving image playback device 10 packetizes video data to be transmitted. If a packet generation period is longer than a horizontal synchronous period of video data, packets include horizontal synchronous signals. In particular, if two horizontal synchronous signals are included in one packet, a data bit correction amount can be detected on the basis of a horizontal scanning period.

First, as described in the above embodiment, a theoretical count value of clock signals of a reference clock is calculated, and the number of clocks in one horizontal synchronous period is counted with the clock of the video signal output device. A difference between the count value and the theoretical count value is detected to calculate a correction amount of data bits in one horizontal scanning period. The number of data bits in each horizontal scanning period is adjusted in accordance with the calculated correction amount.

Further, this value may be converted into a data bit correction amount in a vertical synchronous period on the basis of a calculated correction amount to create an output format described in the above embodiment.

In this modified example, a correction amount of data bits in a horizontal scanning period is detected, so the data bit correction amount can be detected at high speeds.

In addition, if the calculation result of a data bit correction amount in one horizontal scanning period is 1 bit, for example, 1 bit each may be deleted from or added to each horizontal scanning period. If so, it is unnecessary to share the data bit correction amount among horizontal scanning periods and a processing load on the CPU is reduced.

Modified Example 2

In the data bit correction of the above embodiment, a correction amount of data bits is detected for the first one frame of video data received with the video signal output device 20, and data bits of subsequent frames are adjusted. In this modified example, the data bit correction amount is detected periodically, not for the first one frame.

As a result of comparing a data bit correction amount detected for the first frame with a data bit correction amount detected for a frame that appears after the elapse of a predetermined period, if the correction amount is changed, data bits are adjusted in accordance with the change.

For example, if the transmission-side device and the reception-side device are placed under different temperature conditions, a period necessary for stabilizing a clock frequency differs between the devices. Hence, a data bit correction amount varies in accordance with a measurement period. In such cases, a horizontal scanning line is adjusted in accordance with a data bit correction amount detected in a stabilized state.

Hence, it is possible to track the change in data bit correction amount that accompanies the change in the clock, and prevent disturbance of moving images that would occur after the elapse of a long period from the start of moving image display.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A video synchronization device, comprising:
   a video signal output device configured to receive video data transmitted from a transmitter in sync with a first clock, through a communication unit;
   a storage unit configured to store the received video data;
   the video signal output device configured to read the video data from the storage unit in sync with a reference clock, and display moving images on a display unit;
   a synchronization adjustment unit including a FIFO buffer and a data bit correction amount detecting unit;
   the FIFO buffer configured to store the video data and synchronization data corresponding to vertical synchronous signals and horizontal synchronous signals in predetermined units on the basis of a horizontal scanning period;
   the data bit correction amount detecting unit configured to determine a video data correction amount corresponding to a difference between a bit count of reference video data in one vertical synchronous period of the reference clock, and a bit count of video data in one vertical synchronous period of the first clock;
   the synchronization adjustment unit configured to perform a small correction to adjust a predetermined horizontal scanning period in accordance with the video data correction amount if a ratio of the number of data bits not including the correction amount, contained in the horizontal scanning periods of a single vertical scanning period, relative to the number of data bits, including the correction amount, contained in the horizontal scanning periods of a single vertical scanning period, is less than or equal to one-hundred parts per million;
   the synchronization adjustment unit configured to perform a large correction to adjust the predetermined horizontal scanning period in accordance with the video data correction amount if the ratio of the number of data bits not including the correction amount, contained in the horizontal scanning periods of a single vertical scanning period, relative to the number of data bits, including the correction amount, contained in the horizontal scanning periods of a single vertical scanning period, is greater than one-hundred parts per million;
   wherein the synchronization adjustment unit performs the small correction by distributing the video data correction amount to a plurality of invalid horizontal synchronous periods not contributing to the display of moving images so as to delete or add video data, respectively; and
   wherein the synchronization adjustment unit performs the large correction by distributing the video data correction amount to both the plurality of invalid horizontal synchronous periods not contributing to the display of moving images and a plurality of valid horizontal synchronous periods contributing to the display of moving images so as to delete or add video data, respectively.

2. The video synchronization device according to claim 1, wherein the synchronization adjustment unit detects the video data correction amount in accordance with a difference between a count value of the reference clock in one period of vertical synchronous signals and a count value of the first clock in one period of vertical synchronous signals.

3. The video synchronization device according to claim 1, wherein the horizontal scanning period is adjusted such that video data bits are deleted by a detected data amount if a rate of the first clock is lower than a rate of the reference clock, and video data bits are added by a detected data amount if a rate of the first clock is higher than a rate of the reference clock.

4. The video synchronization device according to claim 1, wherein the video data correction amount is equally shared among the plurality of invalid horizontal synchronous periods.

5. The video synchronization device according to claim 1, wherein if the video data correction amount is larger than a predetermined value, the synchronization adjustment unit distributes the video data correction amount to a plurality of invalid horizontal synchronous periods not contributing to the display of moving images and a plurality of valid horizontal synchronous periods contributing to the display of moving images, to delete or add video data and adjust the plurality of invalid horizontal synchronous periods and the plurality of valid horizontal synchronous periods.

6. The video synchronization device according to claim 5, wherein the video data correction amount is equally shared among the plurality of invalid horizontal synchronous periods and the plurality of valid horizontal synchronous periods.

7. The video synchronization device according to claim 5, wherein video data adjusted in the valid horizontal synchronous periods is video data not contributing to the display of moving images in the valid horizontal synchronous periods.

8. The video synchronization device according to claim 1, wherein a predetermined value of the video data correction amount is calculated by multiplying the number of horizontal scanning lines in one vertical synchronous period by $|xc-xd|$ under such a condition that $1-(xc/xd)=100$ ppm, where xd represents the number of video data bits in one horizontal scanning period in a normal state and xc represents the number of video data bits in one horizontal scanning period after correction.

9. The video synchronization device according to claim 1, wherein a difference in the number of video data bits between the invalid horizontal synchronous periods is smaller than a predetermined value.

10. The video synchronization device according to claim 1, wherein a difference in the number of video data bits between the valid horizontal synchronous period contributing to the display of moving images and the invalid horizontal synchronous period is smaller than a predetermined value.

11. The video synchronization device according to claim 1, wherein at least one of the invalid horizontal synchronous period and the valid horizontal synchronous period is adjusted in a vertical synchronous period after detection of the video data correction amount.

12. A video signal output device for receiving video data transmitted from a transmitter in sync with a first clock through a communication unit, storing the video data in a storage unit, reading the video data from the storage unit in sync with a second clock, and displaying moving images on a display unit, comprising:

a synchronization adjustment unit including a FIFO buffer and a data bit correction amount detecting unit;

the FIFO buffer configured to store the video data and synchronization data corresponding to vertical synchronous signals and horizontal synchronous signals in predetermined units on the basis of a horizontal scanning period;

the data bit correction amount detecting unit configured to determine a video data correction amount in accordance with a reference video data amount in one horizontal synchronous period and a video data amount of the second clock in one horizontal synchronous period;

the synchronization adjustment unit configured to perform a small correction to adjust a predetermined horizontal scanning period in accordance with the video data correction amount if a ratio of the number of data bits not including the correction amount, contained in the horizontal scanning periods of a single vertical scanning period, relative to the number of data bits, including the correction amount, contained in the horizontal scanning periods of a single vertical scanning period, is less than or equal to one-hundred parts per million;

the sychronization adjustment unit configured to perform a large correction to adjust the predetermined horizontal scanning period in accordance with the video data correction amount if the ratio of the number of data bits not including the correction amount, contained in the horizontal scanning periods of a single vertical scanning period, relative to the number of data bits, including the correction amount, contained in the horizontal scanning periods of a single vertical scanning period, is greater than one-hundred parts per million;

wherein the synchronization adjustment unit performs the small correction by distributing the video data correction amount to a plurality of invalid horizontal synchronous periods not contributing to the display of moving images so as to delete or add video data; and wherein the synchronization adjustment unit performs the large correction by distributing the video data correction amount to both the plurality of invalid horizontal synchronous periods not contributing to the display of moving images and a plurality of valid horizontal synchronous periods contributing to the display of moving images so as to delete or add video data, respectively.

13. The video signal output device according to claim 12, wherein the synchronization adjustment unit converts the video data correction amount in one horizontal synchronous period into a video data correction amount in one vertical synchronous period, and if the video data correction amount is larger than a predetermined value, the synchronization adjustment unit distributes the video data correction amount to a plurality of invalid horizontal synchronous periods not contributing to the display of moving images and a plurality of valid horizontal synchronous periods contributing to the display of moving images, to delete or add video data and adjust the plurality of invalid horizontal synchronous periods and the plurality of valid horizontal synchronous periods.

14. The video signal output device according to claim 13, wherein a predetermined value of the video data correction amount is calculated by multiplying the number of horizontal scanning lines in one vertical synchronous period by $|xc-xd|$ under such a condition that $1-(xc/xd)=100$ ppm, where xd represents the number of video data bits in one horizontal scanning period in a normal state and xc represents the number of video data bits in one horizontal scanning period after correction.

15. The video signal output device according to claim 12, wherein if a video data correction amount detected in a first time is different from a video data correction amount detected in a second time after the elapse of a predetermined period from the first time, a predetermined horizontal synchronous period is adjusted in accordance with the video data detected in the second time.

16. A video signal output method for receiving video data transmitted from a transmitter in sync with a first clock through a communication unit, storing the video data in a storage unit, reading the video data from the storage unit in sync with a second clock, and displaying moving images on a display unit, comprising:

detecting a video data correction amount by a data bit correction amount detecting unit, in accordance with a reference video data amount in one vertical synchronous period and a video data amount of the second clock in one vertical synchronous period;

storing, in a FIFO buffer, video data and synchronization data corresponding to vertical synchronous signals and horizontal synchronous signals in predetermined units on the basis of a horizontal scanning period;

performing a small correction to adjust a horizontal scanning period in accordance with the video data correction amount if a ratio of the number of data bits not including the correction amount, contained in the horizontal scanning periods of a single vertical scanning period, relative, to the number of data bits, including the correction amount, contained in the horizontal scanning periods of a single vertical scanning period, is less than or equal to one-hundred parts per million;

performing a large correction to adjust the horizontal scanning period in accordance with the video data correction amount if the ratio of the number of data bits not including the correction amount, contained in the horizontal scanning periods of a single vertical scanning period, relative to the number of data bits, including the correction amount, contained in the horizontal scanning periods of a single vertical scanning period, is greater than one-hundred parts per million;

the small correction distributing the video data correction amount to a plurality of invalid horizontal synchronous periods not contributing to the display of moving images so as to delete or add video, respectively; and the large correction by distributing the video data correction amount to both the plurality of invalid horizontal synchronous periods not contributing to the display of moving images and a plurality of valid horizontal synchronous periods contributing to the display of moving images so as to delete or add video data, respectively.

17. The video signal output method according to claim 16, wherein the video data correction amount is equally shared among the plurality of invalid horizontal synchronous periods.

18. The video signal output method according to claim 16, wherein the video data correction amount is equally shared among the plurality of invalid horizontal synchronous periods and the plurality of valid horizontal synchronous periods.

* * * * *

UNITED STATES PATENT AND TRADEMARK OFFICE
CERTIFICATE OF CORRECTION

PATENT NO.         : 8,724,024 B2
APPLICATION NO.    : 11/941538
DATED              : May 13, 2014
INVENTOR(S)        : Akihiro Kubota Page 1 of 1

It is certified that error appears in the above-identified patent and that said Letters Patent is hereby corrected as shown below:

In the Claims

In column 13, claim 12, line 23, before "adjustment unit configured" replace "sychronization" with --synchronization--.

In column 14, claim 16, line 48, after "so as to delete or add" replace "video," with --video data,--.

Signed and Sealed this
Twenty-fourth Day of February, 2015

Michelle K. Lee
*Deputy Director of the United States Patent and Trademark Office*